United States Patent
Okonogi et al.

(10) Patent No.: US 12,482,170 B2
(45) Date of Patent: Nov. 25, 2025

(54) IMAGE PROCESSING DEVICE, IMAGE PROCESSING METHOD, AND IMAGE PROCESSING PROGRAM

(71) Applicant: Socionext Inc., Kanagawa (JP)

(72) Inventors: Katsuyuki Okonogi, Yokohama (JP); Takayuki Kato, Yokohama (JP)

(73) Assignee: SOCIONEXT INC., Kanagawa (JP)

(*) Notice: Subject to any disclaimer, the term of this patent is extended or adjusted under 35 U.S.C. 154(b) by 183 days.

(21) Appl. No.: 18/516,334

(22) Filed: Nov. 21, 2023

(65) Prior Publication Data
US 2024/0096006 A1    Mar. 21, 2024

Related U.S. Application Data

(63) Continuation of application No. PCT/JP2021/019968, filed on May 26, 2021.

(51) Int. Cl.
*G06T 15/20* (2011.01)
*G06T 5/50* (2006.01)
(Continued)

(52) U.S. Cl.
CPC ............... *G06T 15/20* (2013.01); *G06T 5/50* (2013.01); *G06V 20/586* (2022.01); *H04N 5/74* (2013.01); *G06T 2207/20221* (2013.01)

(58) Field of Classification Search
CPC . G06T 15/20; G06T 5/50; G06T 2207/20221; G06T 3/00; G06V 20/586; H04N 5/74; H04N 7/18; B60R 1/27
See application file for complete search history.

(56) References Cited

U.S. PATENT DOCUMENTS

2009/0309970 A1* 12/2009 Ishii ..................... B60R 1/27
                                                    348/143
2010/0245573 A1*  9/2010 Gomi .................... H04N 7/181
                                                    348/148
(Continued)

FOREIGN PATENT DOCUMENTS

JP     2009-096347 A    5/2009
JP     2009-232310 A   10/2009
(Continued)

OTHER PUBLICATIONS

International Search Report dated Aug. 10, 2021 issued in International Patent Application No. PCT/JP2021/019968, with English translation.

(Continued)

*Primary Examiner* — Sarah Lhymn
(74) *Attorney, Agent, or Firm* — Rimon P.C.

(57) ABSTRACT

An image processing device is configured to generate a three-dimensional bird's eye view image by projecting captured images acquired from a plurality of imaging devices onto a three-dimensional projection surface, and includes: an acquiring part configured to acquire position information of a first area, on which an object is to be placed, in a three-dimensional space; a conversion part configured to convert the position information of the first area into position information in accordance with the three-dimensional projection surface; and an output part configured to output the three-dimensional bird's eye view image, on which the object is to be placed on a second area in the three-dimensional space, the second area being specified by the converted position information. By this means, when the three-dimensional bird's eye view image is generated from multiple images, it is possible to display the object naturally in the three-dimensional bird's eye view image.

7 Claims, 13 Drawing Sheets

(51) Int. Cl.
*G06V 20/58* (2022.01)
*H04N 5/74* (2006.01)

(56) References Cited

U.S. PATENT DOCUMENTS

| | | | |
|---|---|---|---|
| 2012/0069153 A1* | 3/2012 | Mochizuki | B60R 1/27 |
| | | | 348/148 |
| 2019/0215465 A1* | 7/2019 | Hayashi | H04N 5/2628 |
| 2020/0031283 A1* | 1/2020 | Nakasho | G08G 1/16 |
| 2020/0139888 A1* | 5/2020 | Yamamoto | B60R 1/002 |
| 2020/0186788 A1 | 6/2020 | Shimizu | |
| 2020/0404191 A1* | 12/2020 | Ozaki | H04N 13/243 |
| 2021/0107465 A1* | 4/2021 | Hiei | G08G 1/168 |
| 2021/0107511 A1* | 4/2021 | Matsunaga | B60W 60/001 |
| 2021/0188289 A1* | 6/2021 | Oba | G08G 1/16 |

FOREIGN PATENT DOCUMENTS

| | | | |
|---|---|---|---|
| JP | 2009-265870 A | 11/2009 | |
| JP | 2010-268369 A | 11/2010 | |
| JP | 2015-015527 A | 1/2015 | |
| JP | 2019-160118 A | 9/2019 | |
| JP | 6730619 B2 * | 7/2020 | |
| JP | 2020-127171 A | 8/2020 | |
| JP | 2021-027366 A | 2/2021 | |
| WO | WO-2019038901 A1 * | 2/2019 | G06T 3/00 |

OTHER PUBLICATIONS

Written Opinion of the International Searching Authority dated Aug. 10, 2021 issued in International Patent Application No. PCT/JP2021/019968, with English translation.

\* cited by examiner

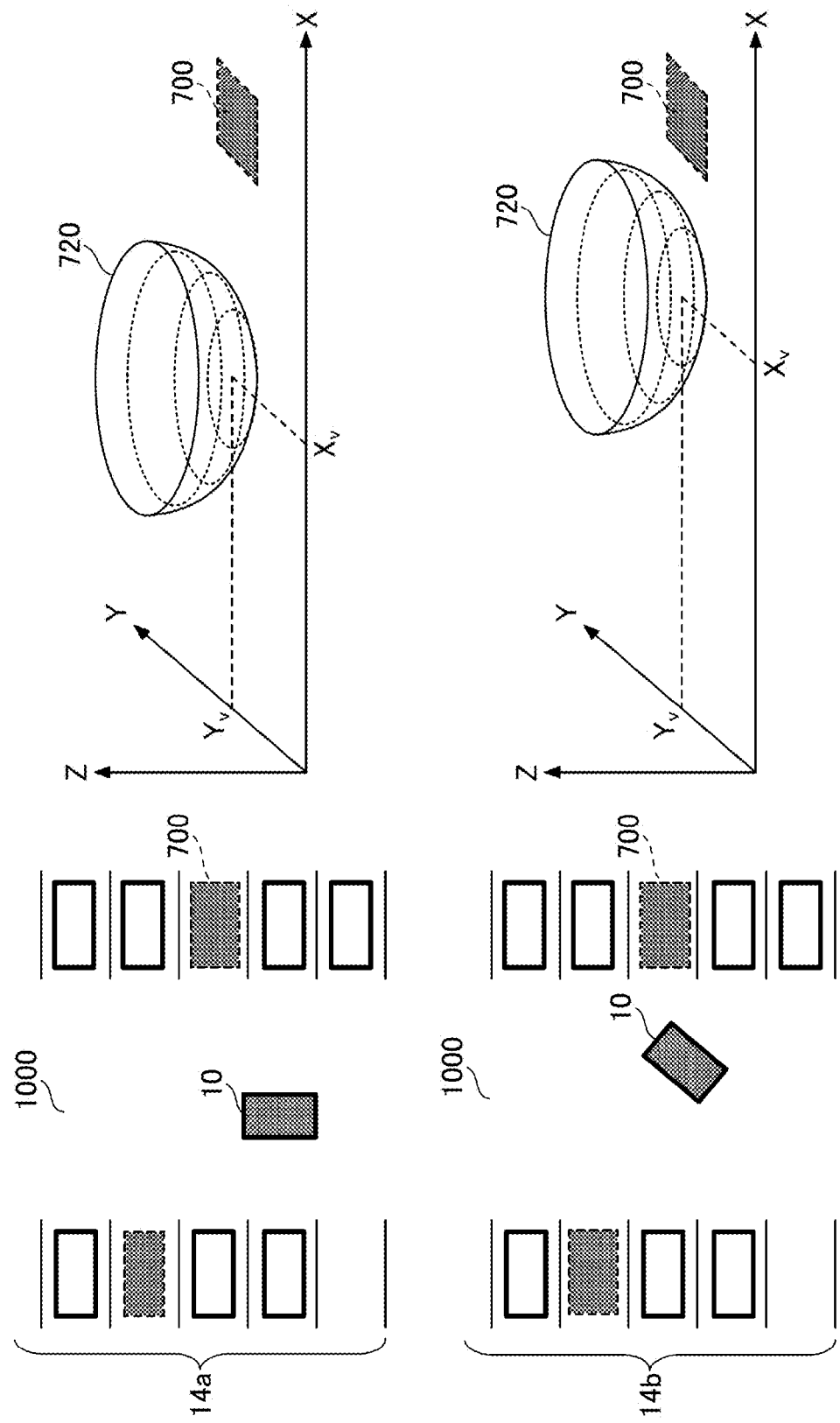

IMAGE PROCESSING DEVICE, IMAGE PROCESSING METHOD, AND IMAGE PROCESSING PROGRAM

CROSS-REFERENCE TO RELATED APPLICATION

The present application is a continuation application filed under 35 U.S.C. 111(a) claiming the benefit under 35 U.S.C. 120 and 365(c) of PCT International Application No. PCT/JP 2021/019968, filed on May 26, 2021, and designating the U.S. The entire contents of PCT International Application No. PCT/JP2021/019968 are incorporated herein by reference.

BACKGROUND OF THE INVENTION

1. Field of the Invention

The present disclosure relates to an image processing device, an image processing method, and an image processing program.

2. Description of the Related Art

There is a three-dimensional bird's eye view image generation system that photographs the surroundings of a mobile entity such as a vehicle by using multiple imaging devices, and that generates a three-dimensional bird's eye view image viewing the whole surroundings of the mobile entity from above by projecting multiple photographed images onto a three-dimensional projection surface by using projection information.

According to the three-dimensional bird's eye view image generation system, for example, when a driver is parking his/her vehicle, it is possible to assist the driver's driving operation by providing the driver with a three-dimensional bird's eye view image of the vehicle.

CITATION LIST

Patent Document

Patent Document 1: Unexamined Japanese Patent Application Publication No. 2009-96347
Patent Document 2: Unexamined Japanese Patent Application Publication No. 2009-232310
Patent Document 3: Unexamined Japanese Patent Application Publication No. 2009-265870
Patent Document 4: Unexamined Japanese Patent Application Publication No. 2010-268369
Patent Document 5: Unexamined Japanese Patent Application Publication No. 2021-27366

SUMMARY OF INVENTION

Technical Problem

Here, in the event the above system is used, while it is possible to display an object that is included in the multiple photographed images in the three-dimensional bird's eye view image, it is still difficult to display a new object in the three-dimensional bird's eye view image naturally.

At least one aspect of the present disclosure therefore aims to display an object naturally when generating a three-dimensional bird's eye view image from multiple images.

Solution to Problem

According to at least one aspect of the present disclosure, an image processing device is configured to generate a three-dimensional bird's eye view image by projecting captured images acquired from a plurality of imaging devices onto a three-dimensional projection surface, and this image processing device includes: an acquiring part configured to acquire position information of a first area, in which an object is to be placed, in a three-dimensional space; a conversion part configured to convert the position information of the first area into position information in accordance with the three-dimensional projection surface; and an output part configured to output the three-dimensional bird's eye view image, on which the object is to be placed on a second area in the three-dimensional space, the second area being specified by the converted position information.

Advantageous Effects of Invention

According to at least one aspect of the present disclosure, it is possible to display an object naturally when generating a three-dimensional bird's eye view image from multiple images.

BRIEF DESCRIPTION OF DRAWINGS

FIG. 14 is a fourth diagram that illustrates a specific example of the process in the second generation part.

DETAILED DESCRIPTION OF THE PREFERRED EMBODIMENTS

Now, embodiments of the present disclosure will be described below with reference to the accompanying drawings. Note that, in this specification and the accompanying drawings, components having substantially the same functional structure are designated by the same reference codes and redundant explanation will be omitted.

First Embodiment

<Three-Dimensional Bird's Eye View Image Generation System and Image Processing Device>

Figure 1:
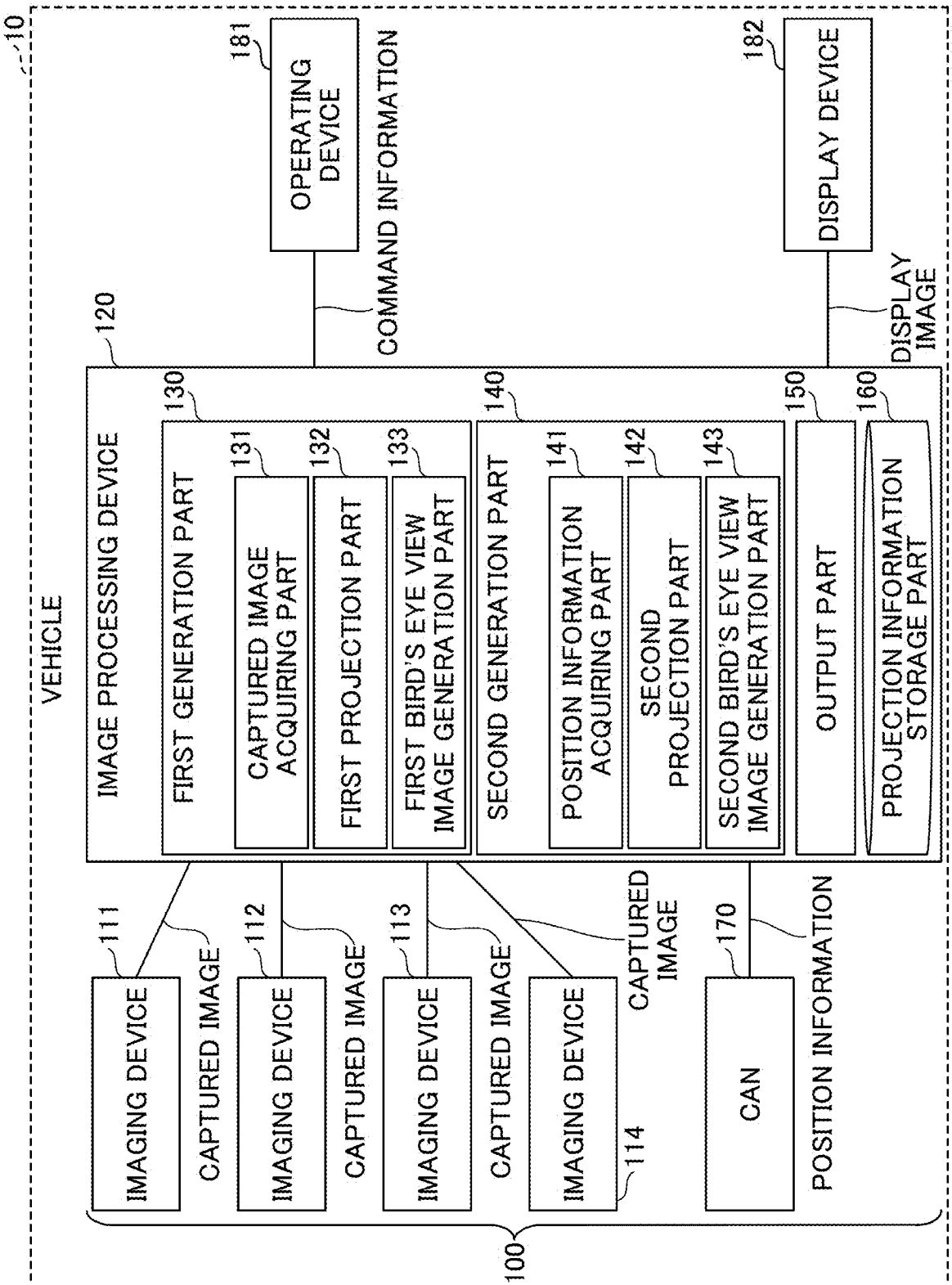
FIG. 1 is a diagram that illustrates an example system structure of a three-dimensional bird's eye view image generation system and an example functional structure of an image processing device.

First, a system structure of a three-dimensional bird's eye view image generation system installed in a mobile entity such as a vehicle, and a functional structure of an image processing device included in the three-dimensional bird's eye view image generation system will be described. FIG. 1 is a diagram that illustrates an example system structure of the three-dimensional bird's eye view image generation system and an example functional structure of the image processing device.

The example system structure of FIG. 1 shows a system structure in which a three-dimensional bird's eye view image generation system 100 is mounted on a vehicle 10. As shown in FIG. 1, the three-dimensional bird's eye view image generation system 100 mounted on the vehicle 10 includes imaging devices 111 to 114, an image processing device 120, a controller area network (CAN) 170, an operating device 181, and a display device 182.

The imaging devices 111 to 114 generate captured images by photographing the front, left, right, and rear sides of the vehicle 10, respectively, and send the thus-generated captured images to the image processing device 120.

An image processing program is installed in the image processing device 120, and, when this program is executed, the image processing device 120 functions as a first generation part 130, a second generation part 140, and an output part 150.

The first generation part 130 generates a first bird's eye view image, which is a three-dimensional bird's eye view image around the vehicle 10. To implement this function, the first generation part 130 includes a captured image acquiring part 131, a first projection part 132, and a first bird's eye view image generation part 133.

When the captured image acquiring part 131 receives, from the operating device 181, command information including a command for generating a display image, the captured image acquiring part 131 acquires the captured images transmitted from the imaging devices 111 to 114.

The first projection part 132 projects each captured image acquired by the captured image acquiring part 131 onto a three-dimensional projection surface, based on projection information stored in a projection information storage part 160.

The first bird's eye view image generation part 133 generates a first bird's eye view image in a predetermined view position and direction based on each captured image projected on the three-dimensional projection surface.

The second generation part 140 generates a second bird's eye view image, which is a three-dimensional bird's eye view image in which an object is to be placed. To implement this function, the second generation part 140 includes a position information acquiring part 141, a second projection part 142, and a second bird's eye view image generation part 143. Note that the object included in the second bird's eye view image may be one that is not included in the captured images transmitted from the imaging devices 111 to 114.

The position information acquiring part 141 acquires position information of the vehicle 10 in a three-dimensional space from the CAN 170. Also, the position information acquiring part 141 acquires position information of the site (first area), on which the object is to be placed, in the three-dimensional space.

The second projection part 142 is an example of a conversion part, and projects the site, on which the object is to be placed, onto a three-dimensional projection surface based on projection information stored in the projection information storage part 160. Also, the second projection part 142 projects the site that is projected on the three-dimensional projection surface, onto the bottom plane of the three-dimensional space, according to the view position and direction for generating the first bird's eye view image.

The second bird's eye view image part generation 143 places the object on the site (second area) projected on the bottom plane of the three-dimensional space, and generates a second bird's eye view image, which is a three-dimensional bird's eye view image based on the above view position and direction. Note that the second bird's eye view image may be an image of the object based on the above view position and direction, not including the captured images transmitted from the imaging devices 111 to 114.

The output part 150 generates a display image by superimposing the second bird's eye view image on the first bird's eye view image. When generating the display image, the output part 150, for example, prioritizes the second bird's eye view image and superimposes it on the first bird's eye view image. By this means, the output part 150 can transmit a three-dimensional bird's eye view image, in which an object is placed, as a display image to the display device 182, and display it on the display device 182.

Hereinafter, each device in the three-dimensional bird's eye view image generation system 100, and the hardware structure and each functional part of the image processing device 120 will be described in detail in order.

<Details of Each Device in the Three-Dimensional Bird's Eye View Image Generation System>

First, an example arrangement and outer structures of devices in the three-dimensional bird's eye view image generation system 100 will be described.

(1) Example of Arrangement

Figure 2:
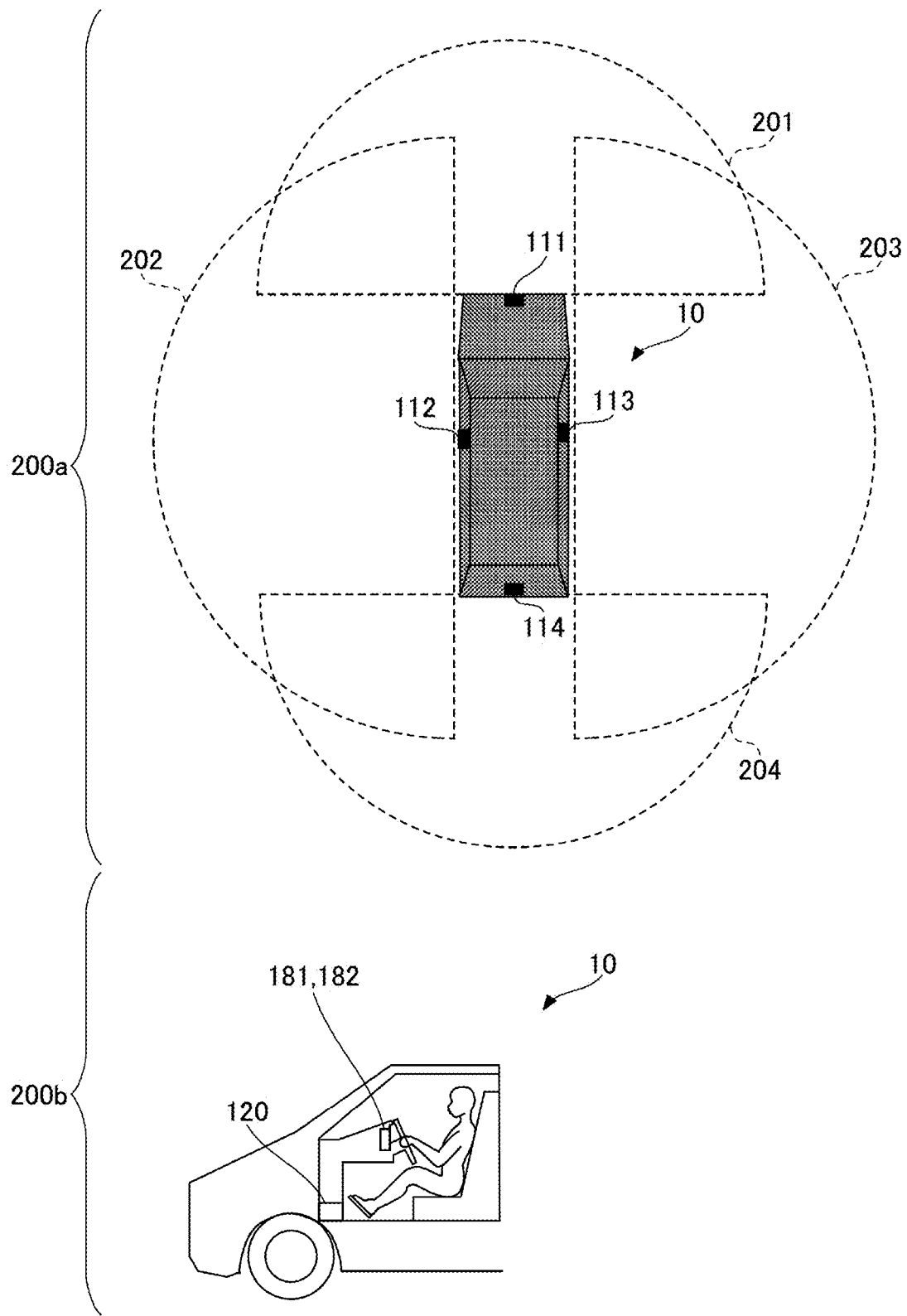
FIG. 2 is a diagram that illustrates an example arrangement of devices in a three-dimensional bird's eye view image generation system.

FIG. 2 is a diagram that illustrates an example arrangement of devices in a three-dimensional bird's eye view image generation system. In particular, 200a in FIG. 2 is a top view that shows an example arrangement of imaging devices in the vehicle 10.

As shown in 200a in FIG. 2, the imaging device 111 is placed in the center of the front of the vehicle 10, and photographs an area in front of the vehicle 10 (the range indicated by a dotted line 201). The imaging device 112 is placed in the center of the left side of the vehicle 10 and photographs an area in the left side of the vehicle 10 (the range indicated by a dotted line 202). The imaging device 113 is placed in the center of the right side of the vehicle 10 and photographs an area in the right side of the vehicle 10 (the range indicated by a dotted line 203). The imaging device 114 is placed in the center of the rear of the vehicle 10 and photographs an area in the rear side of the vehicle 10 (the range indicated by a dotted line 204). Note that the number and arrangement of imaging devices is not limited to what is shown in FIG. 2. The number of imaging devices may be two or more, for example.

200b in FIG. 2 is a side view that shows an example arrangement of the image processing device 120, the operating device 181, and the display device 182 in the vehicle 10. As shown in 200b of FIG. 2, the image processing device 120 is placed in the back of the center console in the vehicle 10. Also, the operating device 181 and the display device 182 are placed on the center console of the vehicle 10.

(2) Outer Structures of the Operating Device and Display Device

Figure 3:
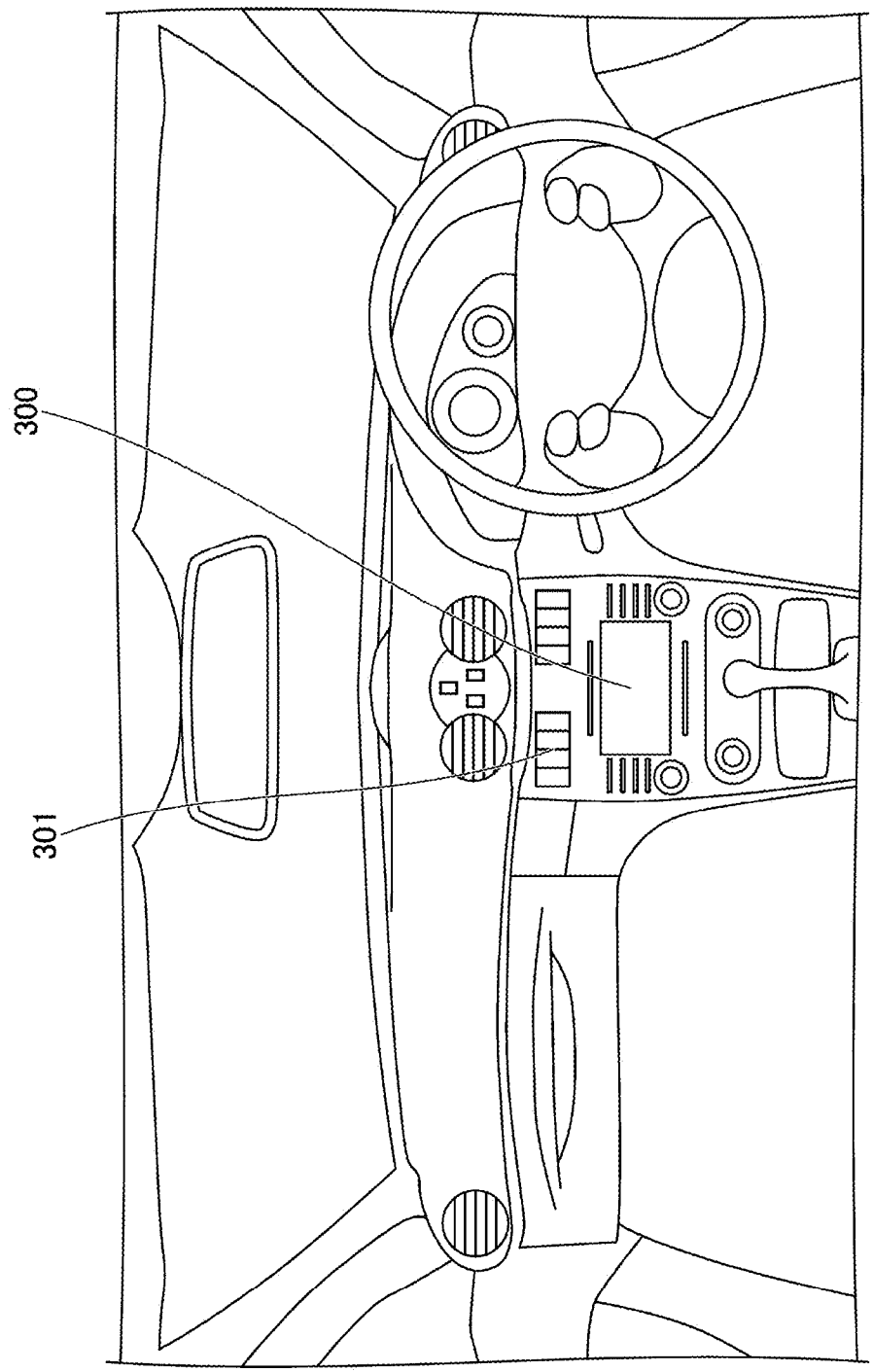
FIG. 3 is a diagram that illustrates example outer structures of an operating device and a display device.

Next, outer structures of the operating device 181 and the display device 182 placed on the center console of the vehicle 10 will be described. FIG. 3 is a diagram that illustrates example outer structures of the operating device and the display device. The present embodiment assumes that the operating device 181 and the display device 182 are integrated together, configured as what is referred to as a "touch panel" 300. As shown in FIG. 3, the touch panel 300 is, for example, embedded and installed in a center console 301 near the center position of the center console 301.

<Hardware Structure of Image Processing Device>

Figure 4:
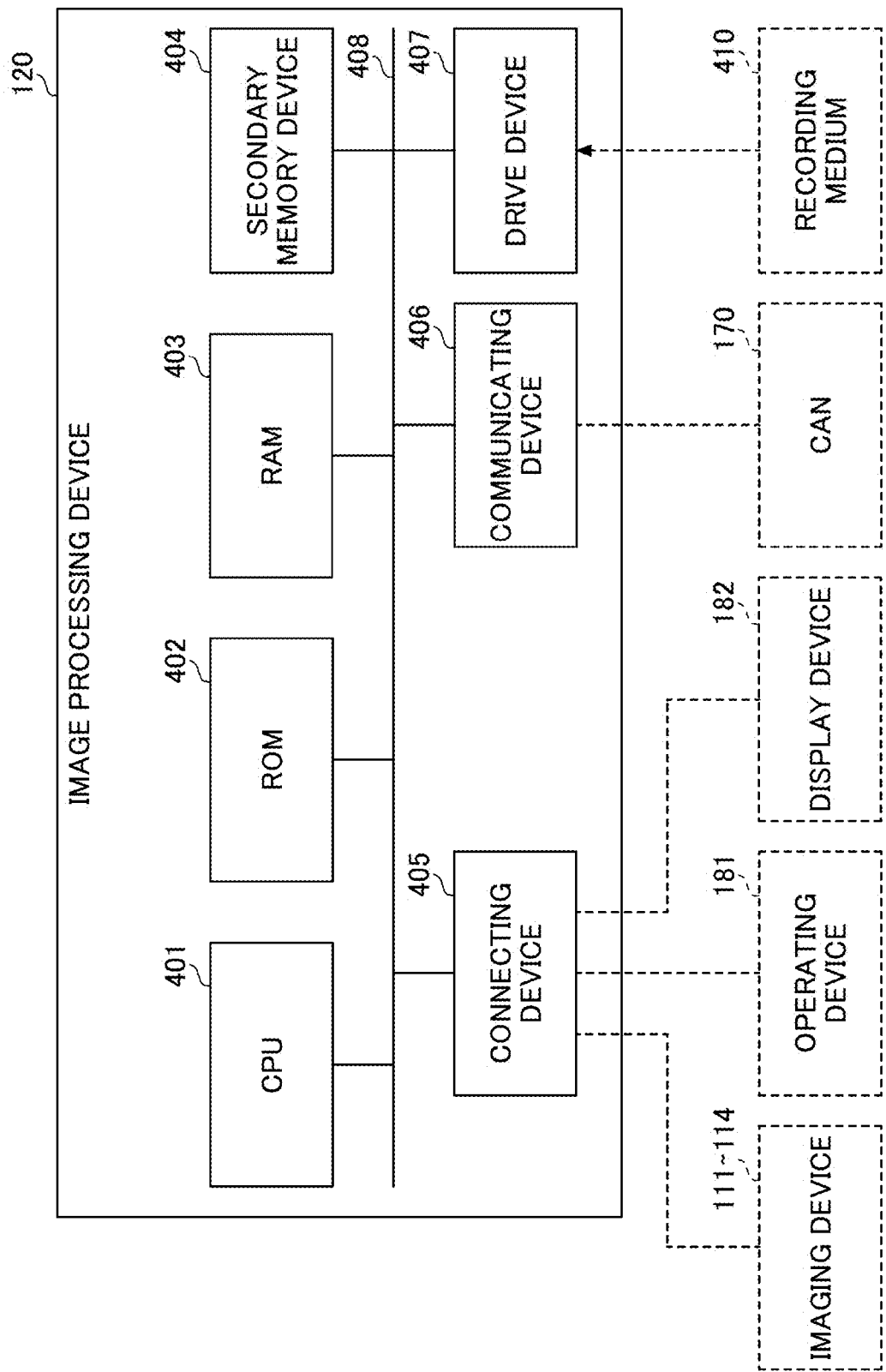
FIG. 4 is a diagram that illustrates an example hardware structure of an image processing device.

Next, the hardware structure of the image processing device 120 will be described. FIG. 4 is a diagram that illustrates an example hardware structure of the image processing device.

As shown in FIG. 4, the image processing device 120 includes a central processing unit (CPU) 401, a read only memory (ROM) 402, and a random access memory (RAM) 403. The CPU 401, ROM 402, and RAM 403 form what is referred to as a computer. Also, the image processing device 120 has a secondary memory device 404, a connecting device 405, a communicating device 406, and a drive device 407. Note that each piece of hardware in the image processing device 120 is connected with each other via a bus 408.

The CPU 401 executes various programs (for example, an image processing program, etc.) installed in the secondary memory device 404.

The ROM 402 is a non-volatile memory. The ROM 402 functions as a primary memory device that stores various programs, data, and so forth, that the CPU 401 needs when executing various programs installed in the secondary memory device 404. To be more specific, the ROM 402 stores boot programs such as a basic input/output system (BIOS), an extensible firmware interface (EFI), and so forth.

The RAM 403 is a volatile memory such as a dynamic random access memory (DRAM) or a static random access memory (SRAM). The RAM 403 functions as a primary memory device that provides a work area in which various programs installed in the secondary memory device 404 are expanded when executed by the CPU 401.

The secondary memory device 404 stores various installed programs and various information used when executing the programs.

The connecting device 405 is for transmitting and receiving signals between external devices (for example, the imaging devices 111 to 114, the operating device 181, and the display device 182) and the image processing device 120.

The communicating device 406 allows communication with external devices via the CAN 170.

The drive device 407 is a device for setting a computer-readable recording medium 410. The recording medium 410 here includes a medium for recording information optically, electrically, or magnetically, such as a CD-ROM, a flexible disk, or a magneto-optical disk. Alternatively, the recording medium 410 may include, for example, a semiconductor memory that records information electrically, such as a ROM or a flash memory.

Note that various programs may be installed in the secondary memory device 404 by, for example, setting a distributed recording medium 410 in the drive device 407, and reading various programs recorded in the recording medium 410 by the drive device 407. Alternatively, various programs may be downloaded from the network via the communicating device 406, and installed in the secondary memory device 404.

<Details of Each Functional Part of the Image Processing Device>

Next, each functional part (here, the first generation part 130 and the second generation part 140) of the image processing device 120 will be described based on specific examples.

(1) Specific Example of the Process in the First Generation Part

Figure 5:
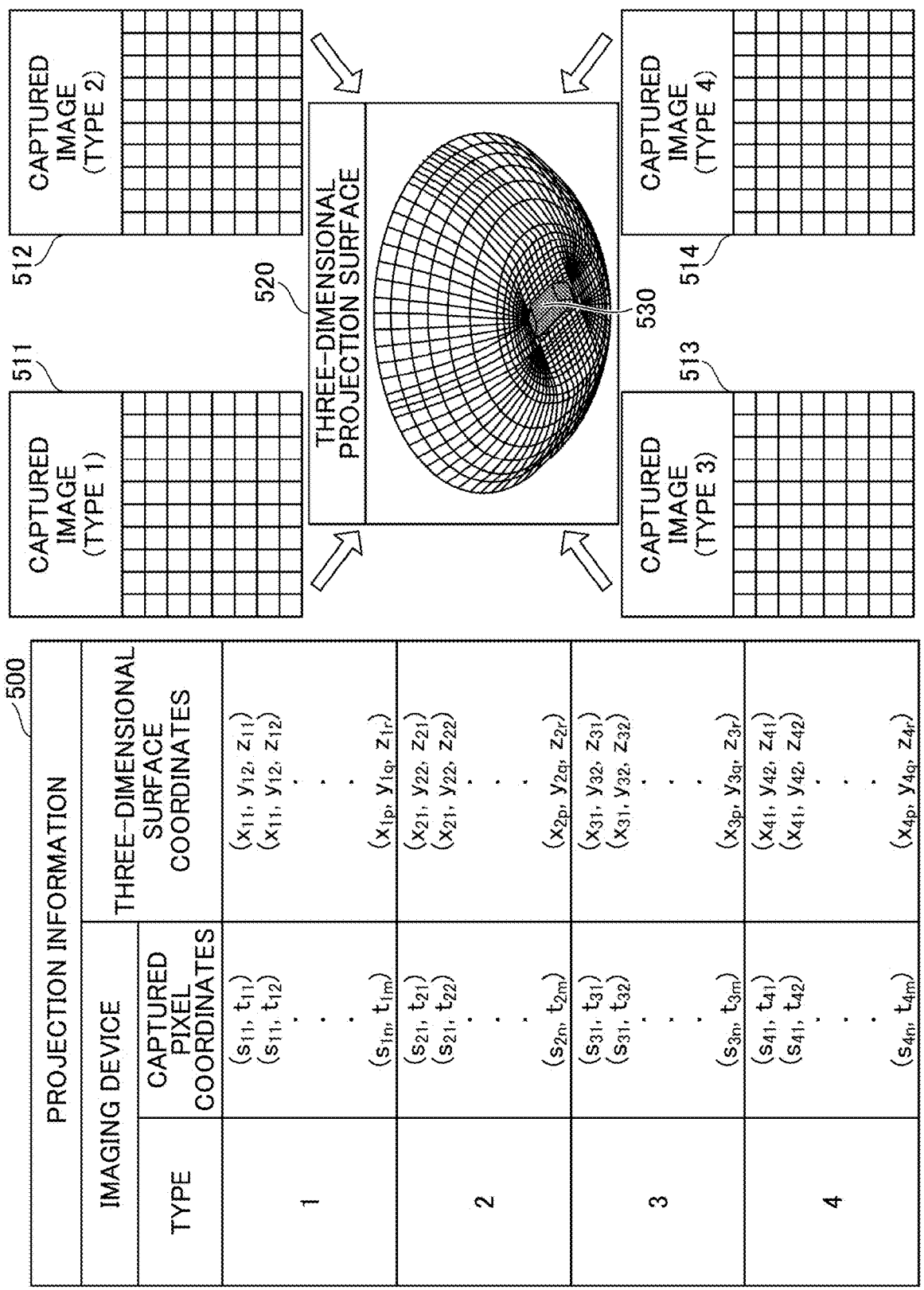
FIG. 5 is a first diagram that illustrates a specific example of a process in a first generation part.

First, a specific example of the process in the first generation part 130 will be described with reference to FIG. 5 and FIG. 6. FIG. 5 is a first diagram that illustrates a specific example of the process in the first generation part. In FIG. 5, projection information 500 is an example of projection information stored in a projection information storage part 160. As shown in FIG. 5, the projection information 500 includes "Imaging device" and "Three-dimensional projection surface coordinates" as information items.

"Imaging device" further includes "Type" and "Captured pixel coordinates." "Type" stores information for identifying between the imaging devices 111 to 114. That is, in the projection information 500, type=1 is the imaging device 111, type=2 is the imaging device 112, type=3 is the imaging device 113, and type=4 is the imaging device 114.

"Captured pixel coordinates" stores the coordinates of each pixel of captured images 511 to 514, photographed by the imaging device 111 to imaging device 114 and acquired by the captured image acquiring part 131. In the present embodiment, the captured images 511 to 514 all have n×m pixels.

Therefore, in the projection information 500, for example, "Captured pixel coordinates" for the imaging device 111 (Type 1) stores n×m coordinates of the captured image 511, from $(s_{11}, t_{11})$ to $(s_{1n}, t_{1m})$. Similarly, "Captured pixel coordinates" for the imaging device 112 (Type 2) stores n×m coordinates of the captured image 512, from $(s_{21}, t_{21})$ to $(s_{2n}, t_{2m})$. Also, "Captured pixel coordinates" for the imaging device 113 (Type 3) stores n×m coordinates of the captured image 513, from $(s_{31}, t_{31})$ to $(s_{3n}, t_{3m})$. Furthermore, "Captured pixel coordinates" of the imaging device 114 (type 4) stores n×m coordinates of the captured image 514, from $(s_{41}, t_{41})$ to $(s_{4n}, t_{4m})$.

The first projection part 132 projects the captured pixel coordinates of the captured images 511 to 514 onto the three-dimensional projection surface 520, and "Three-dimensional projection surface coordinates" stores these coordinates as projected on the three-dimensional projection surface 520. Therefore, each coordinate stored in "Three-dimensional projection surface coordinates" is associated with a corresponding coordinate stored in "Captured pixel coordinates."

For example, in the case of the projection information 500, the captured pixel coordinates $(s_{11}, t_{11})$ of the captured image 511 are associated with the three-dimensional projection surface coordinates $(x_{11}, y_{12}, z_{11})$ on the three-dimensional projection surface 520. Similarly, the captured pixel coordinates $(s_{21}, t_{21})$ of the captured image 512 are associated with the three-dimensional projection surface coordinates $(x_{21}, y_{22}, z_{21})$ on the three-dimensional projection surface 520. Similarly, the captured pixel coordinates ($s_{31}$, $t_{31}$) of the captured image 513 are associated with the three-dimensional projection surface coordinates ($x_{31}$, $y_{32}$, $z_{31}$) on the three-dimensional projection surface 520. Similarly, the captured pixel coordinates ($s_{41}$, $t_{41}$) of the captured image 514 are associated with the three-dimensional projection surface coordinates ($x_{41}$, $y_{42}$, $z_{41}$) on the three-dimensional projection surface 520.

The captured images 511 to 514, photographed by the imaging devices 111 to 114, are acquired by the captured image acquiring part 131 of the image processing device 120, and projected on the three-dimensional projection surface 520 by the first projection part 132, based on the projection information 500.

The captured images 511 to 514 projected on the three-dimensional projection surface 520 are combined in the first bird's eye view image generation part 133, and the three-dimensional image 530 of the vehicle is incorporated therein, thereby generating the first bird's eye view image.

Figure 6:
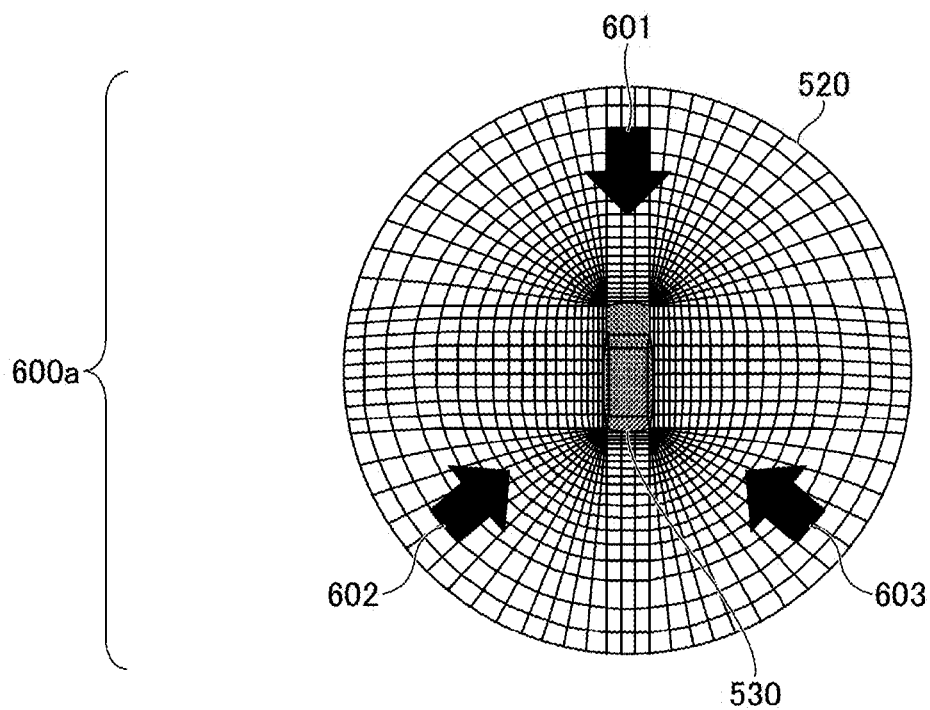
FIG. 6 is a second diagram that illustrates a specific example of the process in the first generation part.
Figure 6:
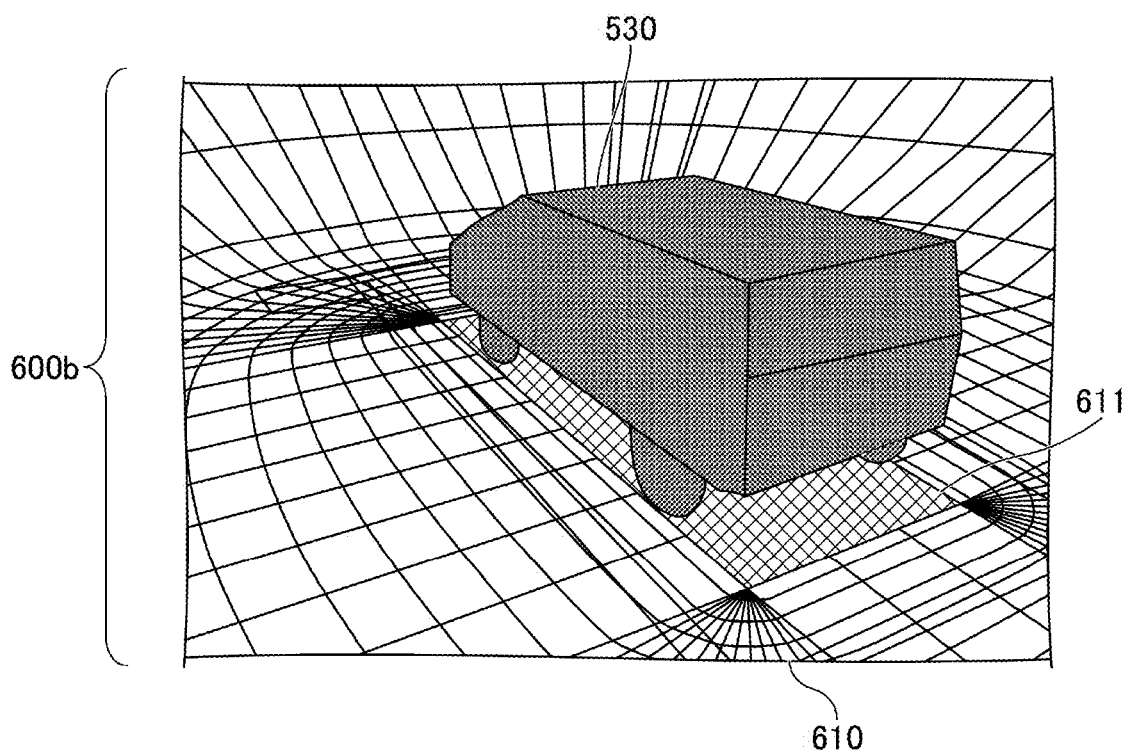

FIG. 6 is a second diagram that illustrates a specific example of the process in the first generation part. In particular, 600a in FIG. 6 is a top view of the three-dimensional projection surface 520, and shows specific examples of the view position and direction that are used when the first bird's eye view image generation part 133 generates the first bird's eye view image, in the top view of the three-dimensional projection surface 520.

In 600a, for example, an arrow 601 is the view position and direction used when generating the first bird's eye view image with a view from the front side of the vehicle. Also, an arrow 602 is the view position and direction used when generating the first bird's eye view image with a view from the left rear of the vehicle. Furthermore, an arrow 603 is the view position and direction used when generating the first bird's eye view image with a view from the right rear of the vehicle.

600b in FIG. 6 shows an example of a first bird's eye view image 610 generated by the first bird's eye view image generation part 133 based on the view position and direction indicated by the arrow 602. As shown in 600b of FIG. 6, the first bird's eye view image generation part 133 can generate a first bird's eye view image viewed diagonally from the rear left of the vehicle, which, for example, shows a three-dimensional image 530 of the vehicle on an area 611, which shows the current position of the vehicle.

(2) Specific Example of the Process in the Second Generation Part

Figure 7:
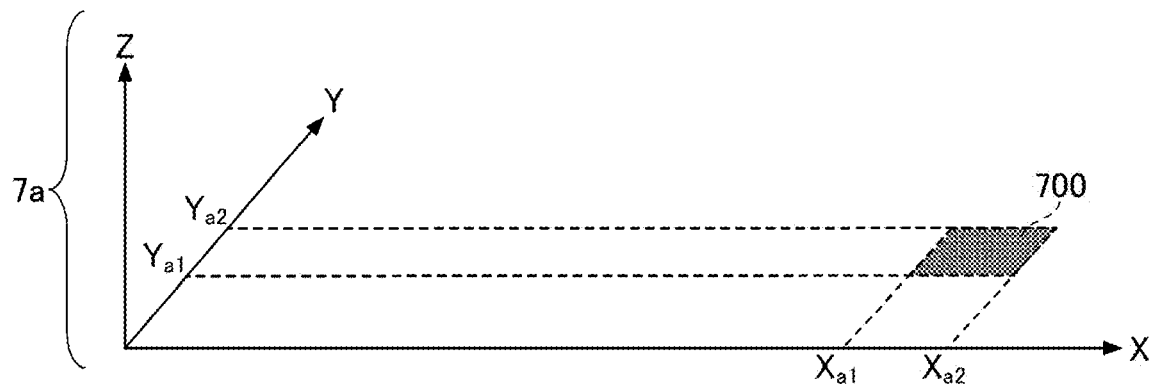
FIG. 7 is a first diagram that illustrates a specific example of a process in a second generation part.
Figure 7:
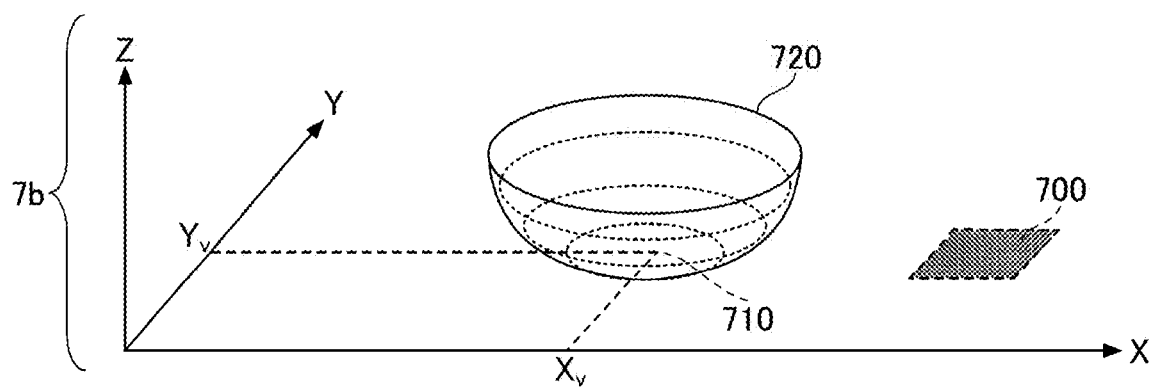
Figure 7:
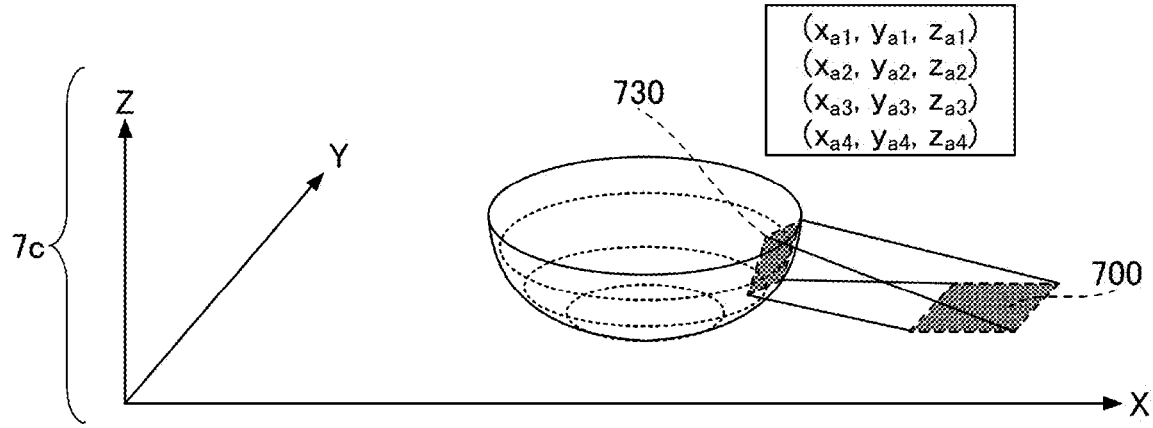
Figure 8:
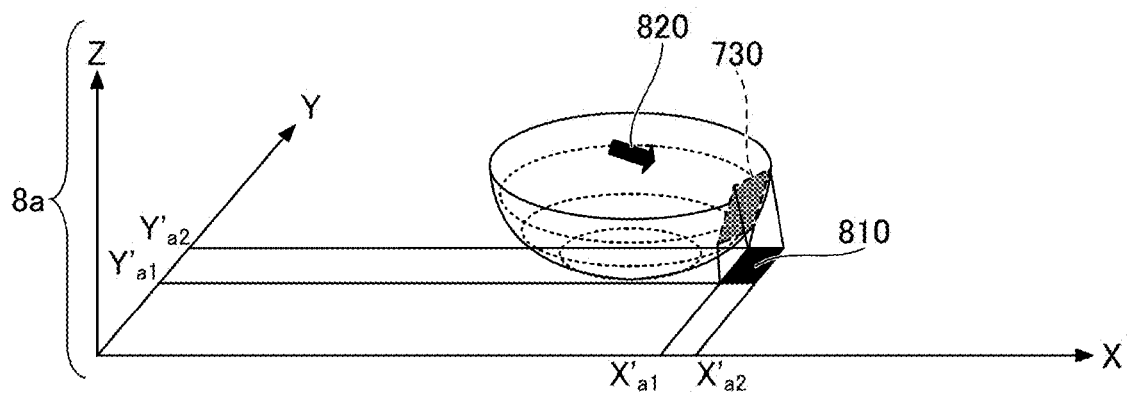
FIG. 8 is a second diagram that illustrates a specific example of the process in the second generation part.
Figure 8:
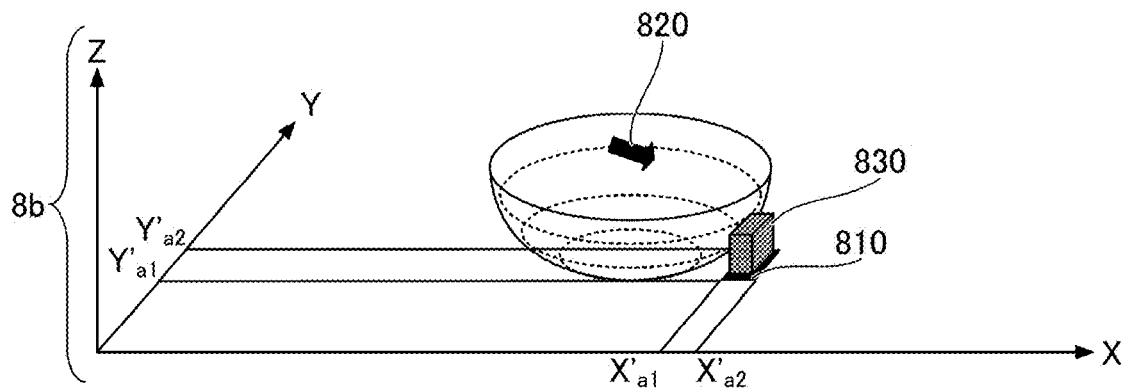

Next, a specific example of the process in the second generation part 140 will be described. FIG. 7 and FIG. 8 are first and second diagrams that show specific examples of the process in the second generation part. In FIG. 7 and FIGS. 8, 7a to 7c and 8a to 8b each show coordinates in the three-dimensional space in which the vehicle 10 moves.

In 7a of FIG. 7, a site 700 (first area) is an area on which an object is to be placed. The example of 7a illustrates a situation in which the position information acquiring part 141 acquires, from the CAN 170, ($X_{a1}$, $Y_{a1}$), ($X_{a1}$, $Y_{a2}$), ($X_{a2}$, $Y_{a1}$), and ($X_{a2}$, $Y_{a2}$) as position information of the site 700 on the bottom plane of the three-dimensional space.

In 7b of FIG. 7, position information 710 shows the position of the vehicle 10 in the three-dimensional space. The example of 7b illustrates a situation in which the position information acquiring part 141 acquires ($X_v$, $Y_v$), from the CAN 170, as position information of the vehicle 10 in the three-dimensional space. Note that, in 7b, a three-dimensional projection surface 720 is a three-dimensional projection surface that is generated at the position of the vehicle 10. In the example of 7b, the position information of the vehicle 10 may be used as the origin in the three-dimensional space, in which case ($X_v$, $Y_v$) is defined as (0, 0).

In 7c of FIG. 7, an area 730 is an area of the three-dimensional projection surface 720 where the site 700 is projected. The example of 7c shows a situation in which the second projection part 142 projects the site 700 onto the three-dimensional projection surface 720, and ($x_{a1}$, $y_{a1}$, $z_{a1}$), ($x_{a2}$, $y_{a2}$, $z_{a2}$), ($x_{a3}$, $y_{a3}$, $z_{a3}$), and ($x_{a4}$, $y_{a4}$, $z_{a4}$) are calculated as position information of the projected area 730.

Next, 8a of FIG. 8 shows a site 810 (second area), in which the projected area 730, projected on the three-dimensional projection surface 720, is projected on the bottom plane of the three-dimensional space based on a predetermined view position and direction 820. The example of 8a shows a situation in which the second projection part 142 projects the area 730 onto the bottom plane of the three-dimensional space, and ($X'_{a1}$, $Y'_{a1}$), ($X'_{a1}$, $Y'_{a2}$), ($X'_{a2}$, $Y'_{a1}$), and ($X'_{a2}$, $Y'_{a2}$) are calculated as position information of the projected site 810.

In 8b of FIG. 8, an object 830 indicates an object that is placed on the projected site 810. The example of 8b shows a situation in which the second bird's eye view image generation part 143 places a rectangular parallelepiped object 830 on the projected site 810.

By this means, the second bird's eye view image generation part 143 can generate a second bird's eye view image (a bird's eye view image on which the object 830 is placed) that does not look unnatural with respect to the first bird's eye view image generated by the first bird's eye view image generation part 133.

<Flow of the Display Image Generation Process>

Figure 9:
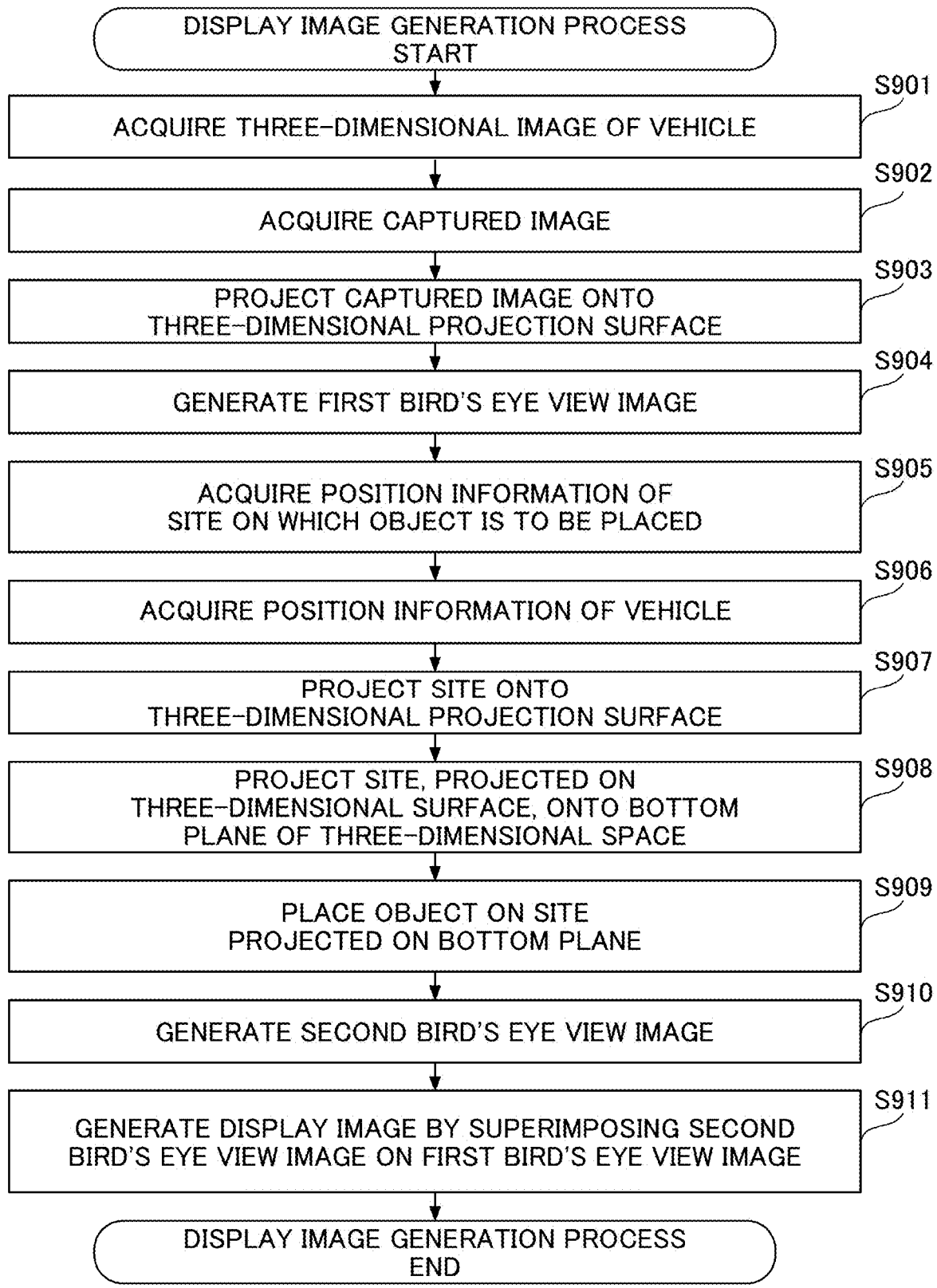
FIG. 9 is a first flowchart that shows a flow of a display image generation process.

Next, the flow of the display image generation process in the image processing device 120 will be described. FIG. 9 is a first flowchart that shows a flow of the display image generation process, which is executed upon receipt of a command for generating a display image from the operating device 181.

In step S901, the first generation part 130 acquires a three-dimensional image of the vehicle, which is used when generating the first bird's eye view image.

In step S902, the first generation part 130 acquires captured images photographed by the imaging devices 111 to 114.

In step S903, the first generation part 130 projects the captured images onto a three-dimensional projection surface.

In step S904, the first generation part 130 generates the first bird's eye view image, in which a three-dimensional image of the vehicle is incorporated, based on a predetermined view position and direction.

In step S905, the second generation part 140 acquires, from the CAN 170, position information of the site on which the object is to be placed, on the bottom plane of the three-dimensional space.

In step S906, the second generation part 140 acquires position information of the vehicle in the three-dimensional space, from the CAN 170. Note that when, for example, the position of the vehicle is defined as the origin, it is possible to skip acquiring the position information of the vehicle.

In step S907, the second generation part 140 projects the site, on which the object is to be placed, onto a three-dimensional projection surface, at a position in accordance with the position information of the vehicle.

In step S908, the second generation part 140 projects the site, which is projected on the three-dimensional projection surface, onto the bottom plane of the three-dimensional space, based on the predetermined view position and direction.

In step S909, the second generation part 140 places the object on the site projected on the bottom plane of the three-dimensional space.

In step S910, the second generation part 140 generates a second bird's eye view image, in which the three-dimensional space where the object is placed is captured based on the predetermined view position and direction.

In step S911, the output part 150 generates a display image, which is a three-dimensional bird's eye view image, by superimposing the second bird's eye view image on the first bird's eye view image. Also, the output part 150 displays the display image generated thus, on the display device 182.

<Scene in which Three-Dimensional Bird's Eye View Image Generation System is Used>

Figure 10:
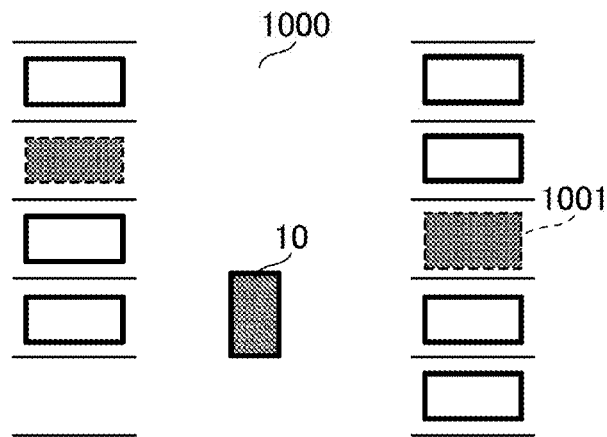
FIG. 10 is a diagram that illustrates an example of a scene in which the three-dimensional bird's eye view image generation system is used.

Next, a scene in which the three-dimensional bird's eye view image generation system 100 is used will be described. FIG. 10 is a diagram that illustrates an example scene in which the three-dimensional bird's eye view image generation system is used, and shows a parking lot 1000 from above.

In FIG. 10, the solid-line quadrilaterals indicate vehicles that are parked, and the dotted-line quadrilaterals indicate parking areas where no vehicle is parked. Among these, a dotted-line quadrilateral 1001 indicates a parking area where the vehicle 10 can be parked.

In such a scene of use, the three-dimensional bird's eye view image generation system 100 assumes that the parking area indicated by the dotted-line quadrilateral 1001 is the site where the object is to be placed, and acquires its position information in the three-dimensional space. Also, the three-dimensional bird's eye view image generation system 100 places a three-dimensional image of the vehicle, as the object, on the parking area indicated by the dotted-line quadrilateral 1001. By this means, prior to parking, the driver of the vehicle 10 can visually check a three-dimensional bird's eye view image, in which his/her vehicle is parked in a parking area that is available, as a display image.

Figure 11:
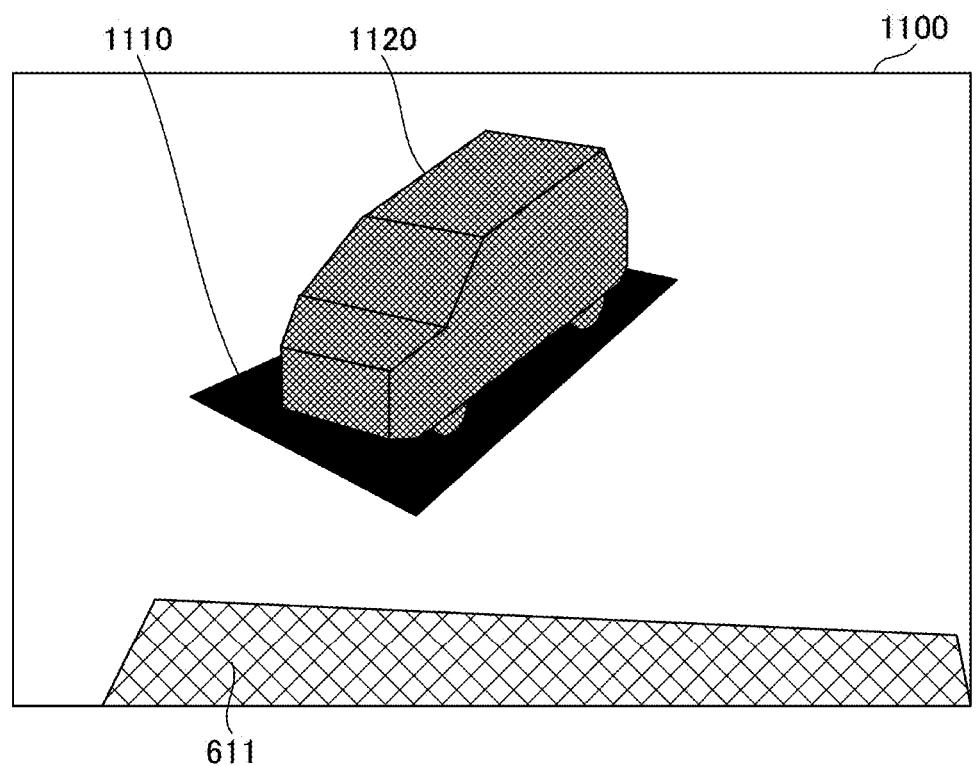
FIG. 11 is a diagram that illustrates a specific example of a display image.

FIG. 11 is a diagram that illustrates a specific example of a display image. As shown in FIG. 11, according to the three-dimensional bird's eye view image generation system 100, a site 1110, corresponding to the parking area indicated by the dotted-line quadrilateral 1001, can be displayed naturally in the display image 1100. Also, as shown in FIG. 11, according to the three-dimensional bird's eye view image generation system 100, a three-dimensional image 1120 of the vehicle can be displayed naturally in the display image 1100.

Note that in the display image 1100, only the area 611, which indicates the current position of the vehicle, is shown in the first bird's eye view image looking down on the vehicle from the side, and the three-dimensional image 530 of the vehicle on this area 611 is omitted.

SUMMARY

As is clear from the above description, the image processing device 120 according to the first embodiment:

generates a first bird's eye view image by projecting captured images acquired from multiple imaging devices onto a three-dimensional projection surface;

acquires position information of a site, on which an object to be placed, in the three-dimensional space;

converts the position information of the site into position information in accordance with the three-dimensional projection surface; and generates and outputs a display image by superimposing a second bird's eye view image, on which the object is to be placed on the site in the three-dimensional space specified by the converted position information, on the first bird's eye view image.

By this means, according to the image processing device 120 of the first embodiment, when a three-dimensional bird's eye view image is generated from multiple captured images, an object can be displayed naturally.

Second Embodiment

A case has been described with the above first embodiment where the second projection part 142 projects a site of a rectangular shape onto the bottom plane of a three-dimensional space. However, the shape of the site that is projected need not be always rectangular. So, a case will be described below with a second embodiment where the site that is projected has a shape other than a rectangular shape.

Figure 12:
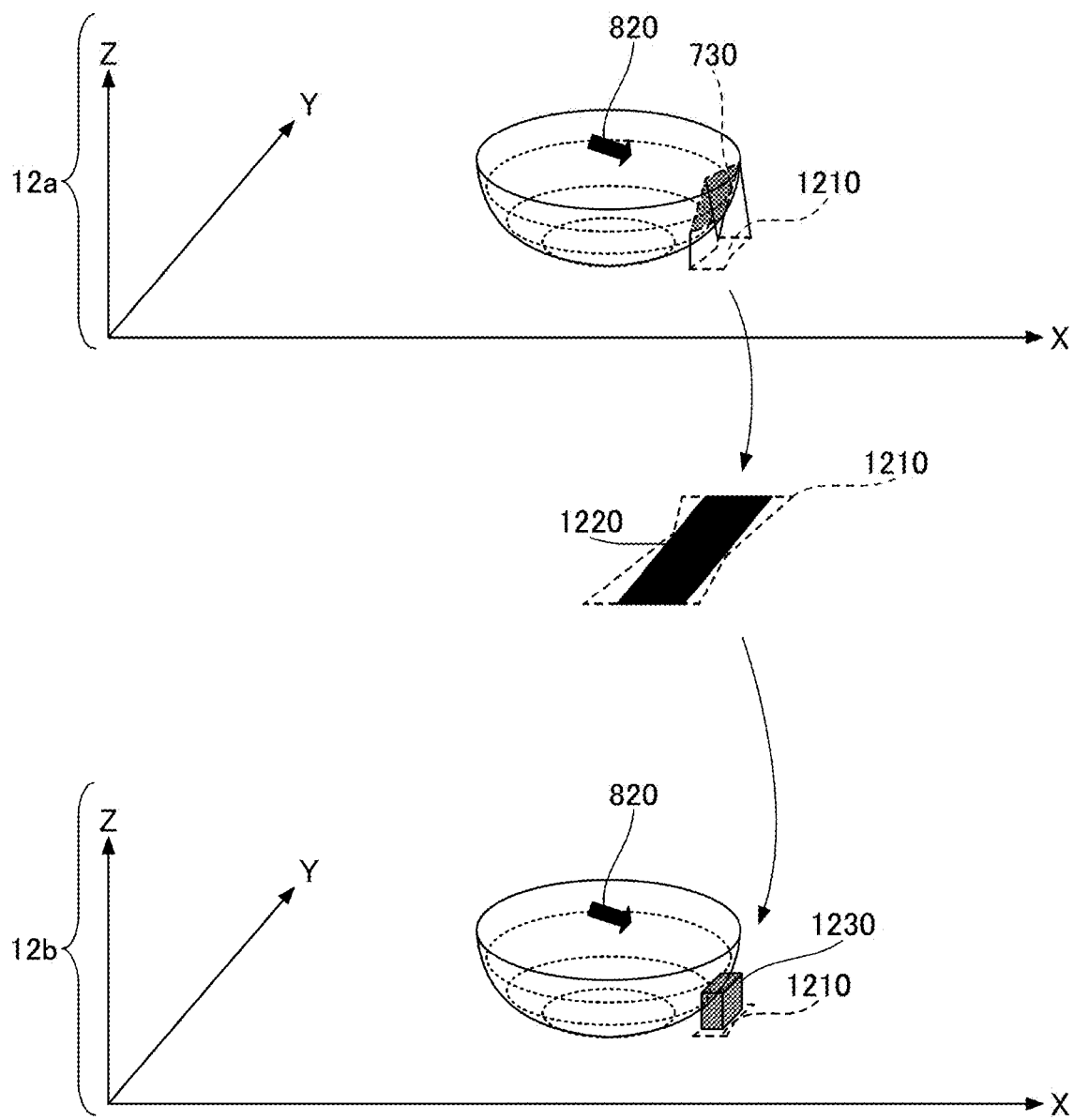
FIG. 12 is a third diagram that illustrates a specific example of the process in the second generation part.

FIG. 12 is a third diagram that illustrates a specific example of the process in the second generation part. The difference here from FIG. 8 is that, in 12a, a site 1210, which is an area where the area 730 projected on the three-dimensional projection surface 720 is projected on the bottom plane of the three-dimensional space based on a predetermined view position and direction 820, has a shape other than a rectangle.

In this case, the second bird's eye view image generation part 143 identifies an inscribed rectangle 1220 in the site 1210, and places an object 1230, included in the specified inscribed rectangle 1220, within the inscribed rectangle 1220 in the site 1210.

12b in FIG. 12 shows a situation in which the object 1230, included within the inscribed rectangle 1220, is placed within the inscribed rectangle 1220 in the site 1210. By this means, with the second bird's eye view image generation part 143, it is possible to avoid a situation in which the object looks distorted in the second bird's eye view image.

Third Embodiment

A case has been described with the above first embodiment where the display image 1100 is generated once. However, the image processing device 120 may be configured to generate a display image every time captured images are acquired at predetermined intervals, and to display, sequentially, the display images generated thus. A third embodiment will be described below, focusing on differences from the first embodiment described above.

<Flow of the Display Image Generation Process>

Figure 13:
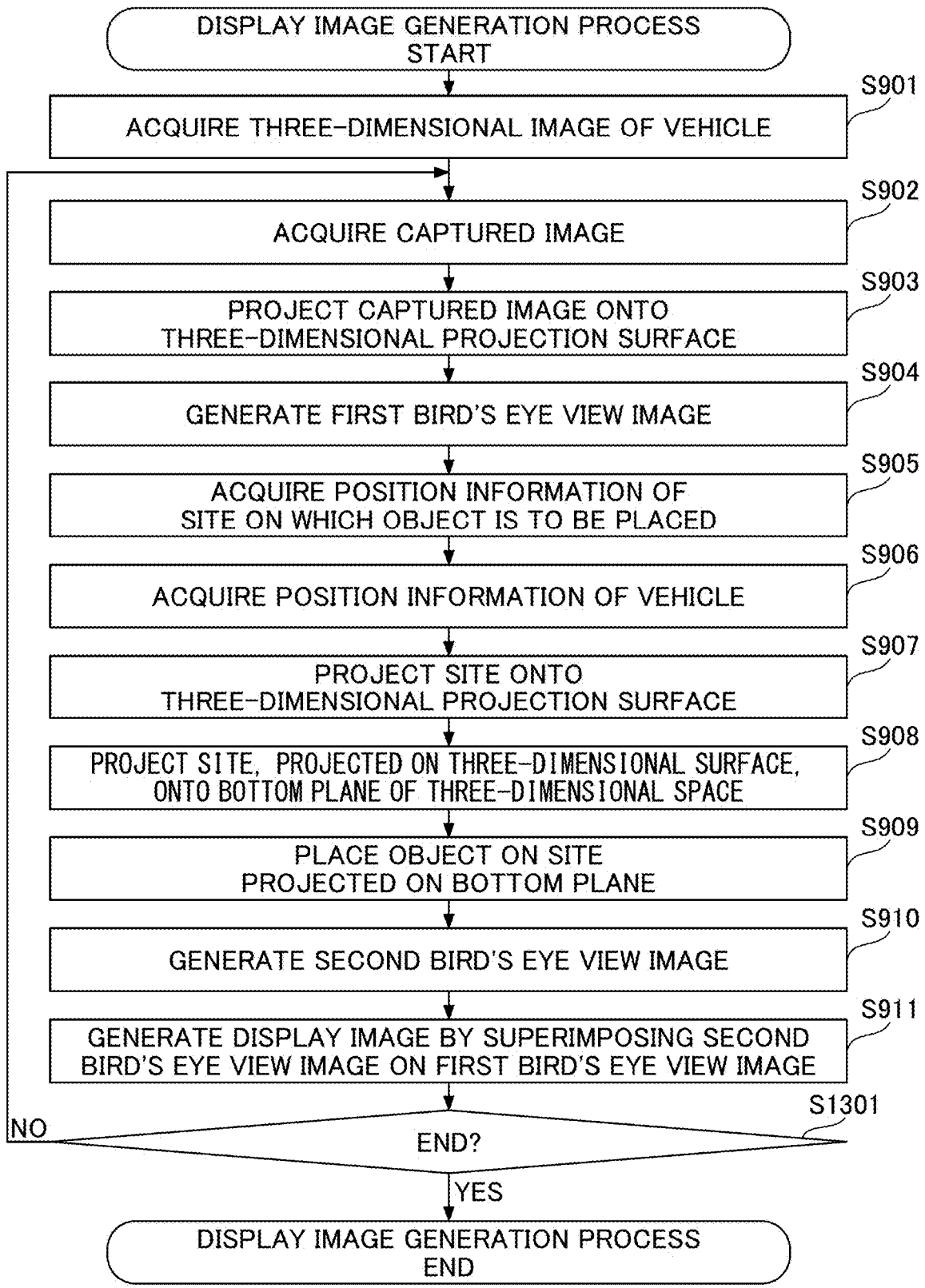
FIG. 13 is a second flowchart that shows a flow of a display image generation process.

First, the flow of the display image generation process in the image processing device 120 will be described. FIG. 13 is a second flowchart that shows a flow of the display image generation process. The difference from the first flowchart described earlier with reference to FIG. 9 lies in step S1301.

In step S1301, the first generation part 130 determines whether or not to end the display image generation process. If it is determined in step S1301 not to end the process (NO in step S1301), the process returns to step S902. By this means, the process from step S902 to step S912 is repeated, and a display image is generated every time captured images are acquired at predetermined intervals.

Note that if it is determined to end the process in step S1301 (YES in step S1301), the display image generation process ends.

Specific Example of the Process in the Second Generation Part

Next, a specific example of the process in the second generation part 140 will be described. FIG. 14 is a fourth diagram that illustrates a specific example of the process in the second generation part. However, FIG. 14 also shows the positions of the vehicle 10 in the parking lot 1000 at different times.

14a in FIG. 14 shows a case in which the vehicle 10 is located far from the site 700. In this case, the three-dimensional projection surface 720 is generated at a position far from the site 700 in the three-dimensional space.

14a in FIG. 14 shows a case in which the vehicle 10 is located close to the site 700. In this case, the three-dimensional projection surface 720 is generated at a position close to the site 700 in the three-dimensional space.

In this way, as the vehicle 10 moves, the relationship between the relative positions of the site 700 and the three-dimensional projection surface 720 changes; accordingly, the position information of the site projected on the three-dimensional projection surface also changes. As a result of this, the site projected in the three-dimensional space also changes.

In other words, by generating a display image every time captured images are acquired, the image processing device 120 can display a three-dimensional image of the vehicle (object), in the display image, even if the vehicle 10 moves.

Other Embodiments

The above embodiments have all been described assuming that the image processing device 120 is installed in the vehicle 10. However, the entity in which the image processing device 120 is installed is by no means limited to the vehicle 10, and mobile entities other than the vehicle 10 may be applied as well.

Also, although the above embodiments have all been described with reference to cases in which a three-dimensional image of a vehicle is placed as an object, the object to be placed is by no means limited to a three-dimensional image of a vehicle, and any three-dimensional image may be used.

Note that the present invention is by no means limited to the structures or configurations described with the above embodiments or combinations thereof with other elements. The present invention therefore can be modified within a range not departing from the spirit of the present invention, and their mode of use/application can be determined as appropriate.

The invention claimed is:

1. An image processing device configured to generate a three-dimensional bird's eye view image by projecting captured images acquired from a plurality of imaging devices onto a three-dimensional projection surface, the image processing device comprising:
   an acquirer configured to acquire position information of a first area, on which an object is to be placed, in a three-dimensional space;
   a converter configured to:
      project the first area onto the three-dimensional projection surface, and
      convert the position information of the first area into the converted position information in accordance with the three-dimensional projection surface by projecting the first area projected on the three-dimensional projection surface onto a second area in the three-dimensional space, based on a view position for generating the three-dimensional bird's eye view image, the second area being specified by the converted position information;
   a first bird's eye view image generator configured to generate a first bird's eye view image based on the view position, by projecting the captured images acquired from the plurality of imaging devices onto the three-dimensional projection surface;
   a second bird's eye view image generator configured to place the object within the second area in the three-dimensional space, and generate a second bird's eye view image based on the view position; and
   a display configured to output the three-dimensional bird's eye view image, on which the object is placed within the second area in the three-dimensional space by prioritizing the second bird's eye view image and superimposing the second bird's eye view image on the first bird's eye view image,
   wherein the imaging devices are mounted on a vehicle, and
   the object is located around a three-dimensional image of the vehicle.

2. The image processing device according to claim 1, wherein the object is placed within a quadrilateral inscribed in the second area.

3. The image processing device according to claim 1, wherein the first bird's eye view image of the vehicle is generated by projecting the captured images acquired from the plurality of imaging devices, which are mounted on the vehicle and photograph areas in front, rear, and sides of the vehicle, onto the three-dimensional projection surface.

4. The image processing device according to claim 3, wherein the first area is a parking area where the vehicle can be parked.

5. The image processing device according to claim 3,
   wherein, every time captured images are acquired from the plurality of imaging devices at predetermined intervals, the first bird's eye view image generator generates the first bird's eye view image by projecting the captured images onto the three-dimensional projection surface in accordance with position information of the vehicle, and
   wherein, every time the first area projected on the three-dimensional projection surface in accordance with the position information of the vehicle is projected on the second area in the three-dimensional space, the second bird's eye view image generator places the object on the second area and generates the second bird's eye view image.

6. An image processing method that can be executed on an image processing device configured to generate a three-dimensional bird's eye view image by projecting captured images acquired from a plurality of imaging devices onto a three-dimensional projection surface, the image processing method comprising:
   acquiring position information of a first area, on which an object is to be placed, in a three-dimensional space;
   projecting the first area onto the three-dimensional projection surface;
   converting the position information of the first area into the converted position information in accordance with the three-dimensional projection surface by projecting the first area projected on the three-dimensional projection surface onto a second area in the three-dimensional space, based on a view position for generating the three-dimensional bird's eye view image, the second area being specified by the converted position information;

generating a first bird's eye view image based on the view position, by projecting the captured images acquired from the plurality of imaging devices onto the three-dimensional projection surface;

generating a second bird's eye view image based on the view position by placing the object within the second area in the three-dimensional space; and outputting the three-dimensional bird's eye view image, on which the object is placed within the second area in the three-dimensional space by prioritizing the second bird's eye view image and superimposing the second bird's eye view image on the first bird's eye view image, wherein the imaging devices are mounted on a vehicle, and the object is located around a three-dimensional image of the vehicle.

7. A non-transitory computer-readable recording medium storing an image processing program that, when executed on a computer of an image processing device configured to generate a three-dimensional bird's eye view image by projecting captured images acquired from a plurality of imaging devices onto a three-dimensional projection surface, causes the computer to:

acquire position information of a first area, on which an object is to be placed, in a three-dimensional space;

project the first area onto the three-dimensional projection surface;

convert the position information of the first area into the converted position information in accordance with the three-dimensional projection surface by projecting the first area projected on the three-dimensional projection surface onto a second area in the three-dimensional space, based on a view position for generating the three-dimensional bird's eye view image, the second area being specified by the converted position information;

generate a first bird's eye view image based on the view position, by projecting the captured images acquired from the plurality of imaging devices onto the three-dimensional projection surface;

generate a second bird's eye view image based on the view position by placing the object within the second area in the three-dimensional space; and output the three-dimensional bird's eye view image, on which the object is placed within the second area in the three-dimensional space by prioritizing the second bird's eye view image and superimposing the second bird's eye view image on the first bird's eye view image, wherein the imaging devices are mounted on a vehicle, and the object is located around a three-dimensional image of the vehicle.

* * * * *